United States Patent [19]

Robertson

[11] Patent Number: 4,626,017

[45] Date of Patent: Dec. 2, 1986

[54] TRAILER STRUCTURE FOR TRANSPORTING SHEET GLASS AND FRANGIBLE MATERIAL

[76] Inventor: Paul E. Robertson, 1842 Hunter Cir., Shreveport, La. 71119

[21] Appl. No.: 785,214

[22] Filed: Oct. 7, 1985

[51] Int. Cl.$^4$ ............................ B60P 3/00; B60P 7/10
[52] U.S. Cl. ......................................... 296/3; 296/10; 410/32; 211/41
[58] Field of Search ....................... 296/3, 10, 25, 181; 410/2, 31, 32; 211/41, 116

[56] References Cited

U.S. PATENT DOCUMENTS

| | | | |
|---|---|---|---|
| 2,100,971 | 11/1937 | McDonald | 296/3 |
| 2,691,233 | 6/1954 | Smith | 280/79.3 |
| 2,815,861 | 12/1957 | Schodorf | 296/3 |
| 3,848,917 | 11/1974 | O'Neal | 296/3 |
| 4,195,738 | 4/1980 | O'Neal | 296/3 |

Primary Examiner—John J. Love
Assistant Examiner—Karin L. Ferriter
Attorney, Agent, or Firm—John M. Harrison

[57] ABSTRACT

A trailer structure for transporting sheet glass and other frangible sheet material which includes in a preferred embodiment, a support structure characterized by a fixed A-frame rigidly mounted on the chassis of a trailer with a cooperating material-supporting saddle frame pivoted on the apex ridge of the fixed A-frame and disposed for controlled pendulum movement responsive to road and motion stresses ecountered during transportation of the glass. The glass or other frangible sheets are secured by conventional straps on the saddle frame for transportation over roads and highways and coil springs with cooperating shock absorbers serve to minimize the transmission of stresses from the trailer chassis and fixed A-frame to the saddle frame. The trailer chassis is fitted with pivoting deck panels to facilitate convenient and safe loading of the glass and to provide additional deck area for other cargo.

20 Claims, 6 Drawing Figures

TRAILER STRUCTURE FOR TRANSPORTING SHEET GLASS AND FRANGIBLE MATERIAL

BACKGROUND OF THE INVENTION

1. Field of the Invention

This invention relates to flatbed trailers which are adapted for hauling frangible sheet material and are towed by tractors over roads and highways. More particularly, the invention relates to a trailer structure which includes a glass-supporting apparatus mounted on a specially designed flatbed trailer and adapted to support loads of uncrated sheet glass, commonly known as "stolz" glass of various length and thickness. The trailer structure is also capable of carrying crated sheet glass of various dimension, as well as other frangible sheet material, such as concrete panels. The support apparatus in the trailer structure of this invention is designed to maintain the sheets of glass in a nearly upright position in order to prevent undue stressing of the glass and to keep both the dimensions of the trailer structure and the glass or other frangible material itself within the legal height and width regulations promulgated by the various governing bodies.

It is frequently desirable to transport multiple, large sheets of glass from a manufacturing facility to various dealers and user locations, where it is unloaded and cut to specification. The glass is initially fabricated in large sheets and is very brittle; as such, it must be transported in a nearly vertical position in order to prevent cracking and breaking due to stress. Maintaining such large glass sheets within the legal height and width regulations of the various regulatory bodies makes it difficult to design a transporting apparatus which will minimize cracking and breaking of the glass. The glass must also be protected from the elements during transportation, since water seepage into the interfaces between the glass sheets makes it virtually impossible to separate the sheets without breaking the glass during unloading.

Sheet glass is normally manufactured by a continuous casting float process and as it cools and solidifies, it is cut while in motion to various lengths. While the glass can be cut to substantially any desired length, the brittle and fragile nature of the material restricts the practical size and the largest dimension to which it is cut is normally $130''\times 204''$. The sheets of glass are then sold and transported to dealers and fabricators and are cut to various sizes, depending on the requirements of customers, at the points of destination. It is the general practice of sheet glass dealerships to stock an inventory of large bulk sheets of glass for this purpose.

2. Description of the Prior Art

There are currently three basic methods of transporting large sheets of glass from one point to another. The first method involves installing removable racks on trailers of proper design configuration, which racks serve to maintain the glass in a nearly vertical orientation. These racks are usually elaborate in design, very expensive, and multiple problems are associated in transporting glass by this technique. First of all, the difficulty of fastening the racks to the trailer in a safe manner is presented. Secondly, the expense of the racks makes it mandatory that they be returned to the shipping point, a procedure which involves additional labor and is expensive. Another problem with this technique of transporting glass is found in the requirement that the trailer to which the racks are attached must be able to twist and stress as the tractor turns and travels over uneven road surfaces. This twisting and bending effect is transferred to the racks and to the glass itself, adding stress which frequently causes the racks to pull loose in the trailer and break the glass. If the racks tilt or the glass cracks, a very dangerous situation is presented and the receiver of the broken glass will normally refuse to unload because of the danger to employees. Accordingly, under such circumstances the load must be transported in a disposal site and removed from the trailer with a crane in order to minimize danger from flying glass shards, even if only one sheet of glass is broken in the load. One advantage in transporting glass with removable racks is the option of transporting other goods and commodities after the glass is delivered and the racks are dismantled from the trailer. However, this option presents the shipper and consignee with the problem and expense of removing, collapsing and storing the racks, as well as shipping the racks back to the point of origin, an expense which frequently overrides the multiple load economic advantage.

A second method of shipping large sheets of glass consists of crating the glass in wood and building wooden A-frames to support the crates in a nearly vertical position. However, all crating and framing material must be discarded at the point of destination, a mandate which requires additional labor and expense. Furthermore, the framing material frequently fails as it is stressed by the twisting, turning and bending of the trailer which results from travel over the roads and highways. Another problem which is inherent in the building of the frames and crates with the glass sheets in place is that of striking the glass with a nail or nails during the crating process and breaking the glass, which breakage may be unnoticed until the glass arrives at its destination.

The third major method of transporting large sheets of glass is on trailers having a certain design configuration which features A-frames built into the trailer itself. Due to this A-frame constructure, the racks must be built in a very sturdy manner to minimize the twisting, turning and bending road effect as the trailer travels around corners and over uneven road and highway surfaces. Furthermore, both the trailer and the rack are subjected to severe stresses as the trailer frame deflects and twists during travel, and such trailers are very heavy, a factor which sometimes limits the legal load-carrying capacity of the trailers. Additionally, these specially designed trailers are normally further limited, in that they are able to carry sheets of glass only, and cannot normally be used to transport other cargo. Accordingly, the transporter must charge a much higher rate in order to compensate for the poor utility of these trailers, although this type of trailer does eliminate the requirement of disposable racks, frames and in-situ fabricated crates, and therefore realizes a lower glass breakage rate. However, occasional breakage is still realized because of the road stresses involved in transporting the glass.

Typical of the early vehicles for carrying plate glass is the "Plate Glass Carrying Truck" disclosed in the U.S. Pat. No. 2,100,971, dated Nov. 30, 1937, to J. M. McDonald. This patent details a truck or vehicle which contains racks that are carried in a nearly vertical position and can be swung inwardly against the side of the truck body when not used to carry the glass. U.S. Pat. No. 2,681,233, dated June 15, 1954, to W. C. Smith, discloses a "Rack for Removing Glass Case Fronts".

This patent details an easel-type rack for temporarily supporting a plate-glass front, for example in a museum showcase, in order to permit the substitution of new exhibits and cleaning of the glass interface by one person. A "Rack for Plate-Glass", is disclosed in U.S. Pat. No. 2,815,861, dated Dec. 10, 1957, to O. L. Shodorf, Sr. The Shodorf rack includes a support device which will receive and support plate-glass on edge and in a slightly leaning position. The rack is constructed of vertically adjustable upper and lower sections, which adjustment is accomplished by means of a gear and rack mechanism associated with the rack. A brake unit automatically locks the rack in any expanding or contracted position to which it is adjusted. U.S. Pat. No. 3,848,917, dated Nov. 19, 1974, to John L. O'Neil, discloses an "Apparatus for Transporting Flat Glass and the Like". This apparatus is designed as a structure for semi-trailers and is used for transporting large sheets of flat, rigid material such as flat glass. A generally A-shaped platform having a central web is secured over a conventional semi-trailer frame. The platform includes multiple, rigid girders extending from a horizontal top bar downwardly on each side of the truck frame to provide a central, sloped support wall. The central web within the wall rests upon the truck frame to support the entire unit. A platform support extends from the lower end of the support wall on each side at a level below the truck frame, to provide a floor for supporting the lower edges of the glass sheets which lean against the support wall. Extensible clamping means is provided to clamp a stack of glass sheets against the support wall and hold the stack against movement during transit. An "Apparatus for Transporting Glass Sheets and the Like" is disclosed in U.S. Pat. No. 4,195,738, to John O'Neil. This apparatus is characterized by an improved device by carrying stacks of large glass sheets for over-the-road movement. The device includes a main truck-trailer frame having a floor and a generally vertical central support for carrying one or more large sheets of glass in a generally vertical position. A fixed guide-bar extends the length of the frame behind the central support and laterally extending rails are removably secured to the guide-bar adjacent the opposed vertical edges of the sheet. A longitudinal rail is adjustably secured to the outer ends of the lateral rails to extend across the outer face of the sheets and means are provided to draw both the lateral and longitudinal rails against the glass sheets to hold it securely against movement. A specially designed bracket is used to secure the lateral rails to the fixed guide-bar and longitudinal rail and provide for vertical adjustment of the height of the lateral and longitudinal rails to accommodate glass sheets of various size.

It is an object of this invention to provide a trailer-mounted support apparatus for supporting sheet glass and other brittle material, which apparatus includes in a first preferred embodiment, a fixed upright structure characterized by an A-frame rack rigidly attached to the primary load-carrying beams of a trailer chassis, with a second glass-carrying saddle rack straddling the rigid A-frame and pivoting like a pendulum on the rigid A-frame rack to minimize road stress.

Another object of the invention is to provide a sheet glass support apparatus which includes a pair of A-frames situated on a drop frame trailer chassis, the first of which A-frames is fixedly secured to the chassis and the second, glass-carrying A-frame designed to "float" or pivot in pendulum fashion on the first A-frame, to facilitate a stress-relieving action for the glass.

Still another object of the invention is to provide a trailer structure for transporting sheet glass and other brittle material, which trailer structure is characterized by a specially designed trailer chassis having a lowered undercarriage and pivoting deck panels and a support apparatus characterized by a first A-frame fixedly attached to the trailer chassis and a second, brittle material-supporting A-frame pivotly saddled to the first A-frame and extending through the undercarriage for carrying multiple sheets of frangible material, with cushion means disposed between the first A-frame and the second A-frame or the trailer chassis to facilitate dampened pendulum movement of the second A-frame, in order to minimize or prevent torsion, bending, linear and oscillating stress in the frangible material during transportation.

Still another object of the invention is to provide a new and improved support apparatus and trailer chassis combination for transporting sheet glass and other brittle material, which resulting trailer structure is characterized by a fixed A-frame mounted on a specially designed drop frame trailer chassis having pivoting deck panels, a movable A-frame saddled or pivotly attached to the fixed A-frame at the apex ridge of the fixed A-frame for carrying multiple glass sheets, with cushioning means, such as air bags, coil springs and/or air or hydraulic cylinders, located between the first A-frame and the second A-frame, or between the second A-frame and the trailer chassis, in order to facilitate movement of the second A-frame and the glass in a pendulum motion with respect to the first A-frame, responsive to operation of the trailer and minimize or eliminate twisting, bending, linear and oscillating stresses in the glass or other material during transportation.

A still further object of this invention is to provide a new and improved support apparatus and modified trailer chassis for transporting sheet glass, which resulting trailer structure is characterized by a trailer chassis having a narrow center section for receiving a supporting A-frame in fixed relationship, with a glass-supporting saddle frame pivotedly attached to and cushioned on the apex ridge of the fixed A-frame and extending through a lowered undercarriage in the trailer chassis, in order to transport sheets of glass in an upright position and minimize stresses in the sheet glass. The trailer chassis further includes hinged deck sections mounted on the trailer to facilitate loading and unloading the glass and transportation of other goods along with, or in place of the sheet glass.

SUMMARY OF THE INVENTION

These and other objects of the invention are provided in a new and improved trailer structure for transporting sheet glass and other frangible sheet material such as concrete panels, which trailer structure includes, in a preferred embodiment, a trailer chassis having a narrow center deck section with a recessed under-carriage on either side of the center deck section and hinged deck plates pivotable over the under-carriage. The trailer structure further includes a support structure characterized by a fixed A-frame secured to the center deck section and a movable A-frame pivotedly saddled on the apex ridge of the fixed A-frame for receiving sheets of glass, with cushioning means positioned between the fixed A-frame and the glass-carrying, pendulum-mounted, movable A-frame, or between the movable A-frame and the trailer chassis, for cushioning the glass during travel.

BRIEF DESCRIPTION OF THE DRAWINGS

The invention will be better understood by reference to the accompanying drawings, wherein:

FIG. 3 is a top elevation of the trailer structure illustrated in FIGS. 1 and 2;

DESCRIPTION OF THE PREFERRED EMBODIMENTS

Figure 1:
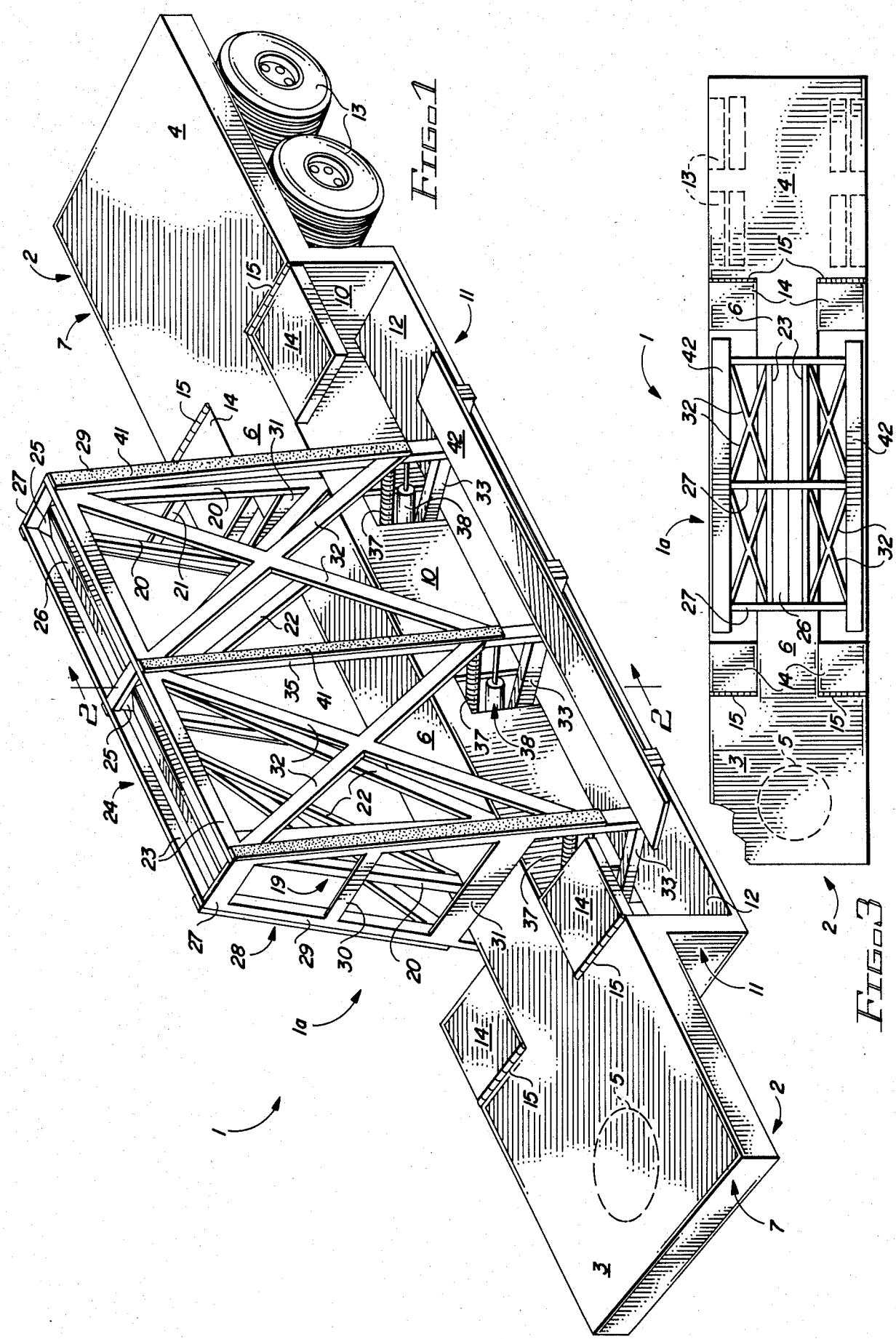
FIG. 1 is a perspective view of a preferred embodiment of the trailer structure for transporting frangible material of this invention.
Figure 2:
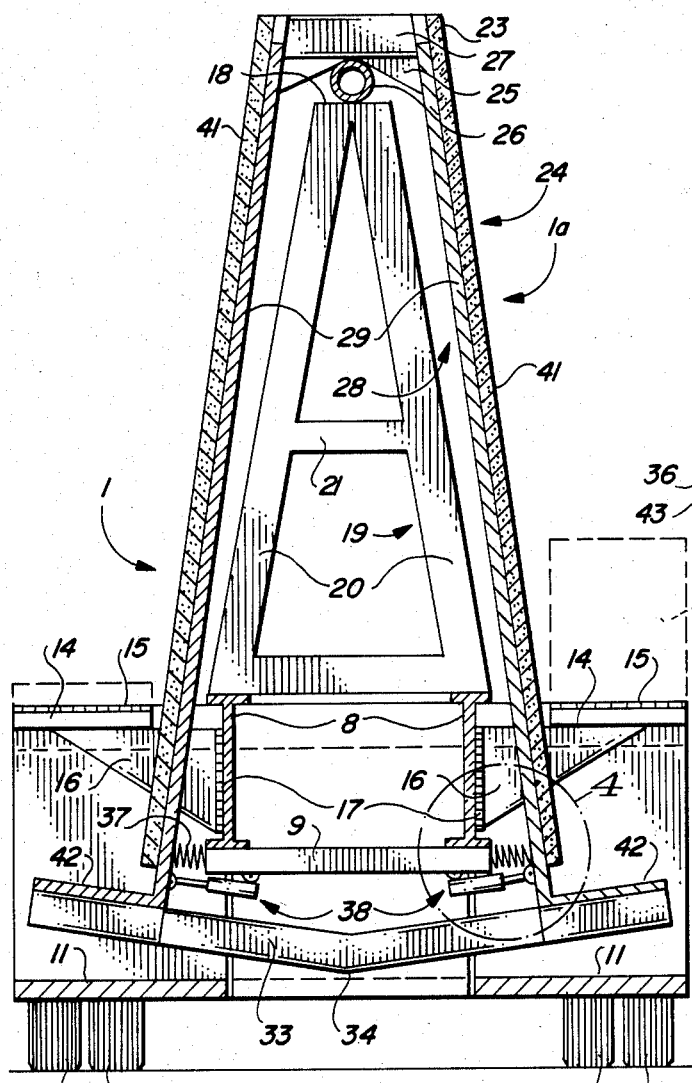
FIG. 2 is a sectional view, taken along line 2—2 of the trailer structure illustrated in FIG. 1.

Referring initially to FIG. 1 of the drawings, in a preferred embodiment, the trailer structure of this invention is illustrated by reference numeral 1 and the support apparatus component of the trailer structure is illustrated by reference numeral 1a. The support apparatus 1a is illustrated in cooperation with a flatbed trailer 2, which is characterized by a flat front deck 3 and rear deck 4, joined by a center section 6. A fifth wheel 5 is provided on the underside of the front deck 3 for connecting the flat bed trailer 2 to a conventional tractor (not illustrated) by means well known to those skilled in the art. The flatbed trailer 2 is further characterized by a trailer chassis 7, provided with longitudinally-oriented chassis beams 8, as illustrated in FIG. 2. The chassis beams 8 are seated on a beam mount 9, which also extends through the center of the flatbed trailer 2 and is supported and braced in the trailer chassis 7 according to techniques well known to those skilled in the art. An optional weather shroud 10 encloses both sides of the chassis beams 8 and the beam mount 9 and trailer chassis 7 are further characterized and configured to define an undercarriage 11, provided with a weather deck 12, which intersects the bottom edge of the weather shroud 10. The weather shroud 10 and weather deck 12 are designed to protect glass sheets from road spray, since wetting of the glass sheets may prevent separation of the sheets during the unloading operation. The flatbed trailer 2 is supported by conventional tandem-mounted tires 13, as illustrated. In a most preferred embodiment of the invention, four deck panels 14 are attached to the front deck 3 and the rear deck 4, respectively, by means of panel hinges 15 and serve to extend the effective support and load area of the front deck 3 and the rear deck 4, when deployed in functional configuration in the plane of the front deck 3 and rear deck 4, as illustrated in FIGS. 1 and 3. As more particularly illustrated in FIG. 5, the deck panels 14 are most preferably supported by four foldable panel supports 16, which are hinged by means of support hinges 17 to the chassis beams 8, in order to selectively support the deck panels 14.

Figure 4:
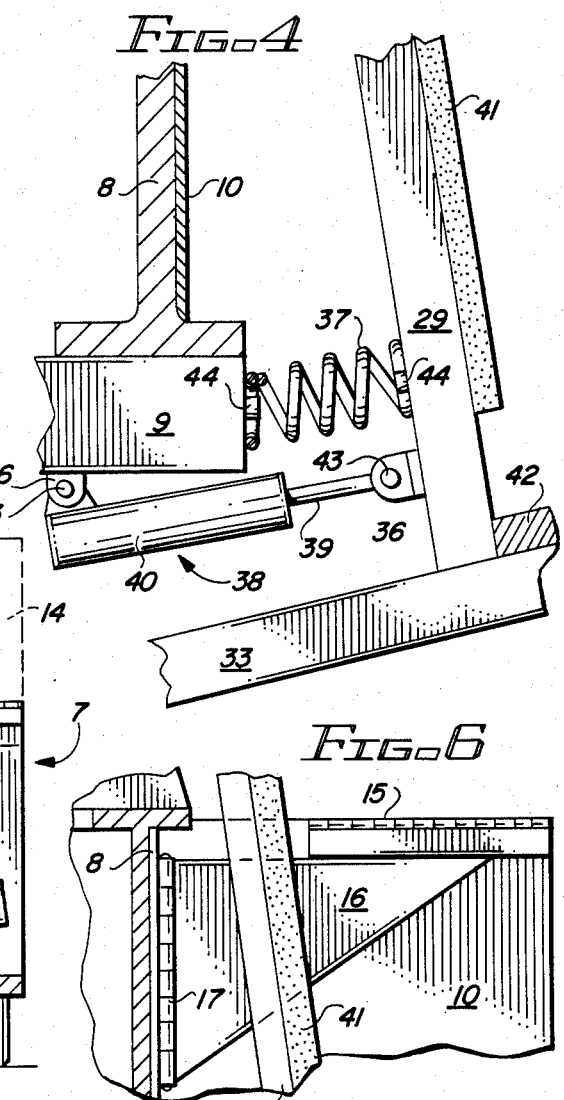
FIG. 4 is a sectional view of a preferred cushioning system positioned between the fixed A-frame and the saddle frame components of the support apparatus in the trailer structure.
Figure 6:
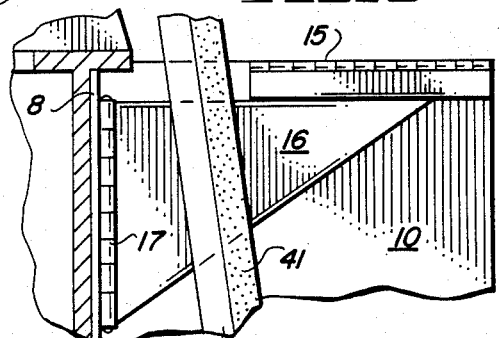
FIG. 6 is a sectional view of a pivoting support for supporting the hinged deck elements illustrated in FIG. 5.

As further illustrated in FIGS. 1-3 and 5 of the drawings in a most preferred embodiment of the invention, the support apparatus 1a is characterized by a fixed A-frame 19, which is rigidly secured to the center section 6 and chassis beams 8 of the flatbed trailer 2 and extends upwardly above the flat-bed trailer 2 to define an apex support surface 18. A rocker pipe 26 is secured by means of straps (not illustrated) to the apex support surface 18. The A-frame 19 is characterized by slanted A-frame legs 20, braced by A-frame end braces 21 and A-frame cross braces 22 and the A-frame 19 is rigidly attached by suitable fasteners, such as bolts (not illustrated) to the flatbed trailer 2 at the center section 6. A saddle frame 24 is also generally shaped in the configuration of an A and fits over the rigid A-frame 19. The saddle frame 24 is characterized by parallel top stringers 23, carrying three rocker panels 25, which span the rocker pipe 26, attached to the apex support surface 18 of the rigid A-frame 19. The saddle frame 24 is further characterized by A shaped end frames 28 comprising end frame legs 29, each having a top brace 27 and a middle brace 30 for stability. A bottom brace 31 is located in close proximity to, but above the center section 6 of the flat-bed trailer 2, and also spans the end frame legs 29. Slanted middle legs 35 span the fixed A-frame 19 between the end frames 28. Cross braces 32 serve to further stabilize the saddle frame 24, and the extending ends of the end frame legs 29, as well as middle legs 35, are each attached to a separate pendulum brace 33, which spans the extending ends of each pair of end frame legs 29 and middle legs 35 in the saddle frame 24, respectively. In a most preferred embodiment of the invention, each of the pendulum braces 33 is characterized by a dihedral 34, which is located in the center of the pendulum braces 33 and serves to facilitate perpendicular mounting of each of the end frame legs 29 and the middle legs 35 to the corresponding segment of a cooperating pendulum brace 33. As further illustrated in FIGS. 1, 2 and 4 of the drawings, coil springs 37 are each mounted by means of spring brackets 44 at one end in spaced relationship on the beam mount 9 and at the opposite end, to the end frame legs 29 and the middle legs 35, respectively. In another most preferred embodiment of the invention, shock absorbers 38 are positioned beneath the coil springs 37 and the piston 39 of each of the shock absorbers 38 is attached to a corresponding end frame leg 29 and middle leg 35, respectively, by means of a shock absorber bracket 36 and cooperating bracket pin 43. The cooperating cylinders 40 of the shock absorbers 38 are attached to the beam mount 9 in the trailer chassis 7 by additional shock absorber brackets 36 and bracket pins 43 in corresponding relationship. Accordingly, movement of the saddle frame 24 in a pendulum-like motion with the pendulum braces 33 moving back and forth alternately compresses and extends the coil springs 37 and the pistons 39 in the cylinders 40 of each of the shock absorbers 38, respectively. It will therefore be appreciated from a consideration of FIGS. 1, 2 and 4 of the drawings that the saddle frame 24 is designed to pivot in the manner of a pendulum with respect to the fixed A-frame 19 and the coil springs 37 and shock absorbers 38 act to dampen this pivoting motion as the flat-bed trailer 2 is towed along a roadway.

Referring again to FIGS. 1 and 2 of the drawings in another preferred embodiment of the invention, a separate glass support 42 spans each of the pendulum braces 33 on separate sides of the undercarriage 11 and is oriented longitudinally along the flat-bed trailer 2 above the weather deck 12 in order to support panels of glass or other brittle material (not illustrated) in stacked relationship on the saddle frame 24. Padding 41 is also provided on the exposed surfaces of the end frame legs 29 and middle legs 35 and can also be provided on the glass support, if deemed necessary.

Figure 5:
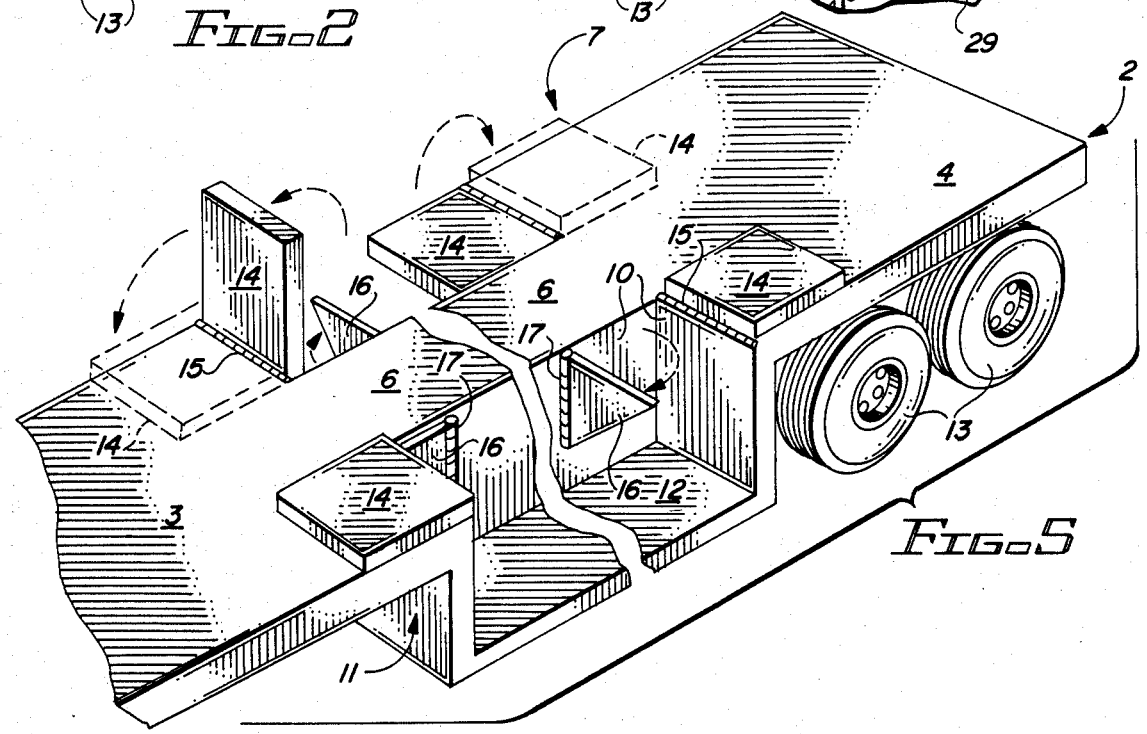
FIG. 5 is a perspective view, partially in section, of the rear and center sections of the trailer structure chassis, more particularly illustrating preferred folding deck elements therein.

In operation, and referring again to FIGS. 1, 2 and 5 of the drawings, when the trailer structure 1 is readied for loading, the front deck 3 and rear deck 4 are initially cleared. The deck panels 14 are then folded on the corresponding panel hinges 15 against the front deck 3 and rear deck 4, respectively, as illustrated in FIG. 5. The panel supports 16 are then folded on the support hinges 17 against the weather shroud 10, on both sides of the undercarriage 11. This operation leaves the entire length of the undercarriage 11 clear for convenient access to the saddle frame 24 in the support apparatus 1a. Glass sheets or other frangible cargo (not illustrated) are then loaded on both sides of the saddle frame 24 by placing the bottom edges of the sheets on the glass supports 42 and resting the sheets in upright, slightly slanted orientation, against the padding 41 on the respective end frame legs 29 and middle legs 35. The glass sheets are padded and strapped on the saddle frame 24 by conventional means (not illustrated) and the flatbed trailer 2 is then coupled to a tractor and transported to the desired destination. The deck panels 14 remain pivoted on the cooperating panel hinges 15 to a position resting on the front deck 3 and rear deck 4, as illustrated in FIG. 5. After the glass or other sheet material is unloaded from the flatbed trailer 2, the deck panels 14 are pivoted on the cooperating panel hinges 15 to a position resting on each corresponding panel support 16, as illustrated in FIGS. 1 and 2. Additional space is thereby provided on the front deck 3 and rear deck 4 for loading cargo in order to render the flatbed trailer 2 more economical to operate when glass sheets are not included in the load. The front deck 3 and rear deck 4 are then loaded with such commodities as plywood, composition board, packages of steel sheets and like cargo and the flatbed trailer 2 is ready for transportation to a desired destination.

Referring again to FIGS. 2 and 4 of the drawings, as the flatbed trailer 2 is towed across roads and highways which are in various states of repair, the tires 13 are periodically oriented in different horizontal planes, due to bumps and uneven pavement support surfaces. Accordingly, the trailer chassis 7 is constantly subjected to torsion, bending, linear and oscillation stresses, which stresses are transmitted to the fixed A frame 19, since the fixed A frame 19 is anchored to the center section 6 and chassis beams 8 of the trailer chassis 7. Particularly threatening to the glass or other brittle material sheets secured on the support apparatus 1a, are twisting, or torsional stresses which are applied longitudinally to the trailer chassis 7 and are transmitted to the fixed A-frame 19. As the trailer chassis 7 is transported over irregularities in the roadway and is subjected to the stress and twisting forces, the top stringers 23 of the saddle frame 24 always remain parallel to the top flanges of the chassis beams 8, respectively. However, the top stringers 23 will not always remain parallel to the bottom flanges of the chassis beams 8, respectively, due to the distortion of the chassis beams 8 by torsional stress. The saddle frame 24 is cushioned by the clearance between the saddle frame 24 and the A-frame 19, since the coil springs 37 and shock absorbers 38 allow the chassis beams 8 and the A-frame 19 to twist and flex within the saddle frame 24, without transferring undue stress to the saddle frame 24 and the brittle load strapped to the saddle frame 24. Accordingly, the rocker pipe 26 and a line connecting the points of contact of the rocker panels 25 with the rocker pipe 26 remain substantially coextensive, regardless of the stress in the chassis beams 8 and A-frame 19, and the coil springs 37 and shock absorbers 38 operate to compensate for the movement of the fixed A-frame 19 with respect to the saddle frame 24. Furthermore, flexure of the chassis beams 8 is reduced by the rigidity of the fixed A-frame 19, and the "floating" design of the saddle frame 24 minimizes deflection of the saddle frame 24 and facilitates spreading of the brittle material load over a wider area than is possible in conventional sheet material support configurations. Accordingly, road stress, including bending, torsional, linear and oscillating stresses are largely prevented from reaching the saddle frame 24, since the coil springs 37 and shock absorbers 38 operate to stabilize the saddle frame 24 with respect to the twisting and flexing chassis beams 8 and allow flexure of the fixed A-frame 19 inside the saddle frame 24. For example, referring to FIG. 2, if the right hand tires 13 move upwardly while the left hand tires descend due to traversal of an uneven road surface, torsional stresses are realized in the trailer chassis 7. These stresses tend to twist the chassis beams 8, beam mount 9 and fixed A frame 19 in a counterclockwise direction. However, as these stresses are applied to the chassis beams 8 and the A-frame 19, the coil springs 37 and shock absorbers 38 allow the fixed A-frame 19 to twist and flex without allowing the stresses to move into the "floating" saddle frame 24. More particularly, if the center of torsional stress is located between the chassis beams 8, then the left-hand coil spring 37 and shock absorber 38 are subjected to a tension load, while the right-hand coil 37 and shock absorber 38 are loaded in compression. Internal adjustment of the coil springs 37 and shock absorbers 38 maintains stability and stress isolation in the saddle frame 24 and minimizes transmission of the stresses to the saddle frame 24 and the brittle load.

Referring again to FIGS. 1 and 5 of the drawings, unloading of the flatbed trailer 2 is accomplished by reversing the loading procedure outlined above. The front deck 3 and rear deck 4 are first unloaded and cleared of cargo and deck panels 14 and panel supports 16 folded on the panel hinges 15 and support hinges 17, respectfully, to clear the area above the weather deck 12 on both sides of the center section 6. The conventional straps (not illustrated) are then removed from the glass panels and the glass is unloaded by conventional techniques.

It will be appreciated by those skilled in the art that the trailer structure 1 of this invention can be constructed to any dimensions which are dictated by the size of the glass sheets or other frangible cargo to be transported. The length of the trailer chassis 7 may vary, but in a most preferred embodiment, pivoting of the deck panels 14 into the functional configuration illustrated in FIGS. 1 and 2 provides supplemented load areas which are, for example, about 16 feet in length in both the front deck 3 and rear deck 4 of a flatbed trailer 2 which is 45 feet in length.

While the preferred embodiments of the invention have been described above, it will be recognized and understood that various modifications and combinations may be made and used therein and the appended claims are intended to cover all such modifications and combinations which may fall within the spirit and scope of the invention.

Having described my invention with the particularity set forth above what is claimed is:

1. An apparatus for supporting frangible sheet material on a trailer chassis and protecting the sheet material from torsional and other road stresses transmitted to the trailer chassis, said apparatus comprising a first A-frame fixedly carried by the trailer chassis; a second A-frame adapted to receive sheets of frangible sheet material and fitted over said first A-frame and pivotally carried by said first A-frame; and cushioning means provided in cooperation with said second A-frame for limiting the pivot of said second A-frame on said first A-frame, whereby said second A-frame is substantially prevented from flexing due to torsional and other road stresses in the trailer chassis and in said first A-frame.

2. The apparatus of claim 1 wherein said cushioning means is at least one air bag located between said second A-frame and the trailer chassis.

3. The apparatus of claim 1 wherein said cushioning means is at least one coil spring located between said second A-frame and the trailer chassis.

4. The apparatus of claim 1 wherein said cushioning means is at least one shock absorber located between said second A-frame and the trailer chassis.

5. The apparatus of claim 1 wherein said cushioning means is at least one coil spring and at least one shock absorber located between said second A-frame and the trailer chassis.

6. The apparatus of claim 1 wherein the top of said first A-frame is shaped to define an apex ridge extending along the longitudinal axis of said first A-frame and further comprising a rocker pipe carried by said apex ridge and a plurality of rocker panels attached to said second A-frame in spaced, transverse relationship with respect to the longitudinal axis of said second A-frame, said rocker panels seated on said rocker pipe in spaced, transverse, rocking relationship.

7. The apparatus of claim 1 wherein said cushioning means is at least one coil spring and at least one shock absorber located between said second A-frame and the trailer chassis, and the top of said first A-frame is shaped to define an apex ridge extending along the longitudinal axis of said first A-frame and further comprising a rocker pipe carried by said apex ridge and a plurality of rocker panels attached to said second A-frame in spaced, transverse relationship with respect to the longitudinal axis of said second A-frame, said rocker panels seated on said rocker pipe in spaced, transverse, rocking relationship.

8. The apparatus of claim 1 wherein said second A-frame projects below said first A-frame and further comprising pendulum braces spanning said second A-frame in spaced relationship, said pendulum braces located beneath said first A-frame.

9. The apparatus of claim 8 wherein said cushioning means is a plurality of coil springs having one end secured to said second A-frame above said pendulum braces, respectively, with the opposite ends of said coil springs attached to the trailer chassis.

10. The apparatus of claim 9 further comprising hydraulic cylinders disposed between said second A-frame and the trailer chassis, said hydraulic cylinders located beneath said coil springs in spaced relationship, respectively.

11. A trailer structure for supporting and protecting frangible sheet material from torsional and other road stresses during transportation on a roadway, said trailer structure comprising a trailer chassis having a pair of load-carrying beams and a connecting mechanism for attachment to a tractor vehicle; and a support apparatus characterized by a first A-frame having a top edge tapered to define an apex ridge, said first A-frame fixedly attached to said beams with said apex ridge projecting above said beams; a second A-frame adapted to receive and support the frangible sheet material, said second A-frame disposed over said first A-frame and laterally pivotable with respect to said first A-frame along said apex ridge; and cushioning means disposed between said first A-frame and said second A-frame for limiting the pivot of said second A-frame on said first A-frame, whereby said second A-frame is stress isolated from said first A-frame and said beams.

12. The trailer structure of claim 11 further comprising at least one pendulum brace spanning said second A-frame, said pendulum brace located beneath said beams and said first A-frame.

13. The trailer structure of claim 11 wherein said trailer chassis further comprises a front deck and a rear deck spaced from said front deck, with said first A-frame and said second A-frame disposed between said front deck and said rear deck and further comprising a first pair of deck panels pivotally carried by said front deck in spaced relationship, said first pair of deck panels selectively pivotable on top of said front deck and rearwardly of said front deck, and a second pair of deck panels pivotally carried by said rear deck in spaced relationship, said second pair of deck panels selectively pivotable on top of said rear deck and forwardly of said rear deck.

14. The trailer structure of claim 13 further comprising a plurality of pendulum braces spanning said second A-frame, said pendulum braces located beneath said first A-frame in spaced, substantially parallel relationship.

15. The trailer structure of claim 11 wherein said cushioning means is successive pairs of coil springs and hydraulic cylinders mounted in spaced, stacked relationship between said second A-frame and said beams.

16. The trailer structure of claim 15 wherein said trailer chassis further comprises a front deck and a rear deck spaced from said front deck with said first A-frame and said second A-frame disposed between said front deck and said rear deck and further comprising a first pair of deck panels pivotally carried by said front deck in spaced relationship, said first pair of deck panels selectively pivotable on top of said front deck and rearwardly of said front deck and a second pair of deck panels pivotally carried by said rear deck in spaced relationship, said second pair of deck panels selectively pivotable on top of said rear deck and forwardly of said rear deck, and further comprising a plurality of pendulum braces spanning said second A-frame, said pendulum braces located beneath said first A-frame in spaced, substantially parallel relationship.

17. A trailer structure for supporting and protecting frangible sheet material from longitudinal torsional stresses during travel, said trailer structure comprising a trailer chassis with load-carrying beams and adapted to be towed on a roadway by a tractor vehicle, and a support apparatus characterized by a first A-frame having sloped first sides terminating at a top edge to define a first apex ridge, with the opposite edges of said first sides fixedly secured to the beams in said trailer chassis; a second A-frame fitted over said first A-frame and pivotally seated on said first apex ridge, said second A-frame having sloped second sides extending below said beams and oppositely-disposed support means terminating said second sides for receiving and supporting the frangible sheet material; a plurality of pendulum braces connecting the extending edges of said sloped second sides beneath said beams; and cushioning means positioned between said sloped second sides and said beams, respectively, for isolating and stabilizing said second A-frame from flexure due to road stresses transmitted to said trailer chassis and said first A-frame.

18. The apparatus of claim 17 wherein said cushioning means is successive pairs of coil springs and hydraulic cylinders mounted in spaced, stacked relationship above said pendulum braces, respectively.

19. The trailer structure of claim 18 further comprising a rocker pipe carried by said apex ridge of said first A-frame and a plurality of rocker panels attached to said second A-frame in spaced, transverse relationship with respect to the longitudinal axis of said second A-frame, said rocker panels seated on said rocker pipe in spaced, transverse, rocking relationship.

20. The trailer structure of claim 19 wherein said trailer chassis further comprises a front deck and a rear deck spaced from said front deck, with said first A-frame and said second A-frame disposed between said front deck and said rear deck and further comprising a first pair of deck panels pivotally carried by said front deck in spaced relationship, said first pair of deck panels selectively pivotable on top of said front deck and rearwardly of said front deck, and a second pair of deck panels pivotally carried by said rear deck in spaced relationship, said second pair of deck panels selectively pivotable on top of said rear deck and forwardly of said rear deck.

* * * * *